United States Patent
Dahodwala et al.

(10) Patent No.: US 10,480,369 B1
(45) Date of Patent: Nov. 19, 2019

(54) EXHAUST AFTER-TREATMENT SYSTEM FOR DIESEL INTERNAL COMBUSTION ENGINES

(71) Applicant: FEV North America Inc., Auburn Hills, MI (US)

(72) Inventors: Mufaddel Dahodwala, West Bloomfield, MI (US); Tamas Szailer, Clarkston, MI (US); Satyum Joshi, Farmington Hills, MI (US); Erik Koehler, Birmingham, MI (US); Michael Franke, Rochester Hills, MI (US)

(73) Assignee: FEV NORTH AMERICA INC., Auburn Hills, MI (US)

( * ) Notice: Subject to any disclaimer, the term of this patent is extended or adjusted under 35 U.S.C. 154(b) by 0 days.

(21) Appl. No.: 16/142,634

(22) Filed: Sep. 26, 2018

(51) Int. Cl.
  *F01N 3/20* (2006.01)
  *B01D 53/94* (2006.01)
  (Continued)

(52) U.S. Cl.
  CPC ....... *F01N 3/2013* (2013.01); *B01D 46/0027* (2013.01); *B01D 53/944* (2013.01); *B01D 53/9431* (2013.01); *B01D 53/9481* (2013.01); *B01D 53/9495* (2013.01); *F01N 3/035* (2013.01); *F01N 3/0814* (2013.01); *F01N 3/103* (2013.01); *F01N 3/106* (2013.01); *F01N 3/208* (2013.01); *F01N 3/28* (2013.01); *F01N 3/36* (2013.01); *F01N 9/00* (2013.01); *F01N 13/009* (2014.06); *B01D 2255/904* (2013.01); *B01D 2255/91* (2013.01); *B01D 2279/30* (2013.01);
  (Continued)

(58) Field of Classification Search
  CPC ... F01N 3/2013; F01N 13/009; B01D 53/944; B01D 53/9481
  USPC .................................................. 422/174, 168
  See application file for complete search history.

(56) References Cited

U.S. PATENT DOCUMENTS

| 8,931,265 B2 | 1/2015 | Ramamurthy |
| 9,512,761 B2 | 12/2016 | Ancimer et al. |

(Continued)

FOREIGN PATENT DOCUMENTS

| DE | 102008013777 A1 | 10/2008 |
| DE | 102012002995 A1 | 9/2012 |

(Continued)

*Primary Examiner* — Tom P Duong
(74) *Attorney, Agent, or Firm* — Dickingson Wright PLLC

(57) ABSTRACT

An exhaust after-treatment system is coupled to an exhaust pipe of a diesel internal combustion engine (ICE) for treating an exhaust gas. The exhaust after-treatment system includes a diesel oxidation catalyst (DOC) and a SCR coated diesel particulate filter (SDPF) serially disposed in a downstream path of the exhaust gas. An electrically heated catalyst (EHC) is coupled to the DOC and is configured to electrically heat the DOC for reducing the requisite time to reach a DOC light-off temperature. A controller is operably coupled with the DOC and the EHC and is configured to operate the EHC in response to a mid bed temperature of the DOC. More specifically, the controller is configured to supply power to the EHC when the DOC mid bed temperature is below a predetermined value and discontinue the power supply to the EHC when the DOC mid bed temperature is greater than the predetermined value.

7 Claims, 5 Drawing Sheets

(51) Int. Cl.

| | |
|---|---|
| *F01N 13/00* | (2010.01) |
| *F01N 9/00* | (2006.01) |
| *F01N 3/10* | (2006.01) |
| *F01N 3/28* | (2006.01) |
| *F01N 3/36* | (2006.01) |
| *F01N 3/08* | (2006.01) |
| *F01N 3/035* | (2006.01) |
| *B01D 46/00* | (2006.01) |

(52) U.S. Cl.
CPC ...... *F01N 2570/14* (2013.01); *F01N 2610/02* (2013.01); *F01N 2610/03* (2013.01); *F01N 2900/1602* (2013.01)

(56) References Cited

U.S. PATENT DOCUMENTS

| | | |
|---|---|---|
| 9,528,413 B2 | 12/2016 | Katare et al. |
| 2014/0360162 A1* | 12/2014 | Gonze ............... F01N 3/2013 60/274 |
| 2018/0112574 A1 | 4/2018 | Petri et al. |
| 2018/0128197 A1 | 5/2018 | Dahodwala et al. |

FOREIGN PATENT DOCUMENTS

| | | |
|---|---|---|
| DE | 102014009016 A1 | 12/2015 |
| DE | 102015115104 A1 | 3/2016 |
| EP | 2342433 B1 | 7/2011 |
| EP | 2795076 A1 | 10/2014 |
| EP | 2834488 B1 | 2/2015 |
| EP | 3099905 A1 | 12/2016 |
| EP | 2661546 B1 | 6/2017 |

* cited by examiner

EXHAUST AFTER-TREATMENT SYSTEM FOR DIESEL INTERNAL COMBUSTION ENGINES

BACKGROUND OF THE INVENTION

1. Field of the Invention

The subject disclosure relates in general to the field of motor vehicle emissions control, and more particularly to an exhaust after-treatment system coupled to an exhaust pipe of a diesel internal combustion engine (ICE) for treating and removing nitrogen oxides (NOx) from diesel exhaust gas.

2. Description of the Prior Art

This section provides background information related to the present invention which is not necessarily prior art.

New regulations for exhaust gas emissions for motor vehicles continue to provide challenges for emission and onboard diagnostic (OBD) compliance. Such regulations require that levels of hydrocarbons (HC), carbon monoxide (CO), and nitrogen monoxide (NO) in exhaust gas exiting an exhaust system of a motor vehicle be below predefined levels set by one or more government agencies and regulations, e.g. the Clean Air Act. These regulations also require that the levels of nitrogen oxides (NOx) and non-methane hydrocarbons (NMHC) be below predetermined levels in diesel engine exhaust. For example, the 2010 HD emission regulations require that NOx emissions be below 0.02 g/bhp-hr. These regulations are concurrently balanced by a desire to reduce fuel consumption by motor vehicles.

A motor-vehicle engine system may include a series of exhaust after-treatment devices that suppress feed gas emissions from an engine to meet these regulations. These systems may include a nitrogen-oxide (NOx) trap, a diesel-type oxidation catalyst (DOC), a diesel-type particulate filter (DPF), a passive NOx absorber (PNA), a selective catalytic reduction (SCR), a SCR coated diesel particulate filter (SDPF), or an ammonia slip catalyst (ASC). Such devices may be arranged differently in different motor-vehicle exhaust systems.

For example, as illustrated in FIG. 1, in one arrangement of a prior art diesel exhaust after-treatment system, a DOC/DPF is arranged upstream of an SCR device. Indeed, the 2010 HD emission regulations mandate the use of an SCR catalyst device in an after-treatment system to meet the 0.20 g/bhp-hr NOx emission limit set by the regulations. However, the drawback of the SCR catalyst in this conventional after-treatment system is that it only starts to function after the SCR catalyst temperature exceeds 200 degrees C. For cold start applications, it is critical to increase the SCR catalyst temperature above 200 degrees C. in the shortest possible time, while for low load applications the challenge is to maintain the catalyst temperature about 200 degrees C. throughout the operating cycle.

In conventional SCR heat-up strategies, the aim is to use diesel fuel (either post injection or in-exhaust HC dosing) until the SCR mid-bed temperature reaches 200 degrees C. However, the fuel dosing cannot be initiated until the DOC light-off temperature is reached. A conventional 2010 after-treatment configuration (DOC/DPF/SCR/ASC), such as illustrated in FIG. 1, takes approximately 450 seconds to raise the SCR mid-bed temperature above 200 degrees C. on cold start HD-FTP cycle. Thus, at present, engine OEM's are only successful in meeting the 0.20 g/bhp-hr NOx emission limit by applying conventional aftertreatment configurations and heat-up strategies.

However, the California Air Resources Board (ARB) recently funded a research program to investigate the feasibility of reducing NOx emissions below the 0.20 g/bhp-hr limit set by the 2010 HD emissions standards. Specifically, the ARB is considering the reduction of the NOx emissions regulations by an additional 90% —down to 0.02 g/bhp-hr. This standard will require a significant reduction in the time required for the SCR mid-bed temperature to reach 200 degrees. The ARB is expected to implement this CARB Ultra Low NOx standard of 0.02 g/bhp-hr in the 2023-2027 timeframe, and the EPA is expected to mirror the implementation.

The ARB sponsored a project conducted by the Southwest Research Institute (SWRI) to evaluate a number of advanced exhaust components and heat-up strategies to meet this CARB Ultra Low NOx standard of 0.02 g/bhp-hr. For example, with reference to FIG. 2, the ARB project concluded that exhaust after-treatment systems which add an SCR coated diesel particulate filter (SDPF) were able to reach a much lower composite NOx. Additionally, with reference to FIG. 3, the ARB project recommended an exhaust after-treatment system that further added a mini burner (MB) between the DOC/PNA to reach the 0.02 g/bhph target with minimum fuel penalty. However, the incorporation of a mini burner into an exhaust after-treatment system presents reliability concerns and ODB challenges.

Accordingly, a continuing need exists for improved combustion control strategies, systems and methods that meet the Ultra Low NOx standard of 0.02 g/bhp-hr being considered for implementation by the ARB in the 2023-2027 timeframe.

SUMMARY OF THE INVENTION

This section provides a general summary of the invention and is not intended to be a comprehensive disclosure of its full scope, aspects, objectives, and/or all of its features.

An exhaust after-treatment system includes a diesel oxidation catalyst (DOC) disposed in a downstream path of exhaust gas produced by the diesel internal combustion engine, along with an SCR coated diesel particulate filter (SDPF) disposed downstream of the diesel oxidation catalyst. An electrically heated catalyst (EHC) is coupled to the diesel oxidation catalyst and is configured to electrically heat the diesel oxidation catalyst. A fuel dosing system is placed upstream of the electrically heated catalyst and is configured to increase the mid bed temperature of the SCR coated diesel particulate filter. A controller is operably coupled with the diesel oxidation catalyst, the SCR coated diesel particulate filter, the electrically heated catalyst and the fuel dosing system and is configured to operate the electrically heated catalyst and fuel dosing system in response to a detected mid bed temperature of the diesel oxidation catalyst and the SCR coated diesel particulate filter. As will be described in more detail below, the intelligent operation of the electrically heated catalyst and fuel dosing system based on the mid bed temperature of the diesel oxidation catalyst and the SCR coated diesel particulate filter reduces an amount of time to reach a DOC light-off temperature as well as the time required to raise the mid bed temperature of the SCR coated diesel particulate filter to enable urea dosing, and thus leads to significantly improved reduction of NOx emissions relative to the prior art systems.

These and other objects, features and advantages of the present invention will become more apparent from the following description

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Example embodiments will now be described more fully with reference to the accompanying drawings. The example embodiments are provided so that this disclosure will be thorough and fully convey the scope to those skilled in the art. Numerous specific details are set forth such as examples of specific components, devices, mechanisms, assemblies, and methods to provide a thorough understanding of various embodiments of the present disclosure. It will be apparent to those skilled in the art that specific details need not be employed, that example embodiments may be embodied in many different forms, and that neither should be construed to limit the scope of the disclosure.

Figure 4:
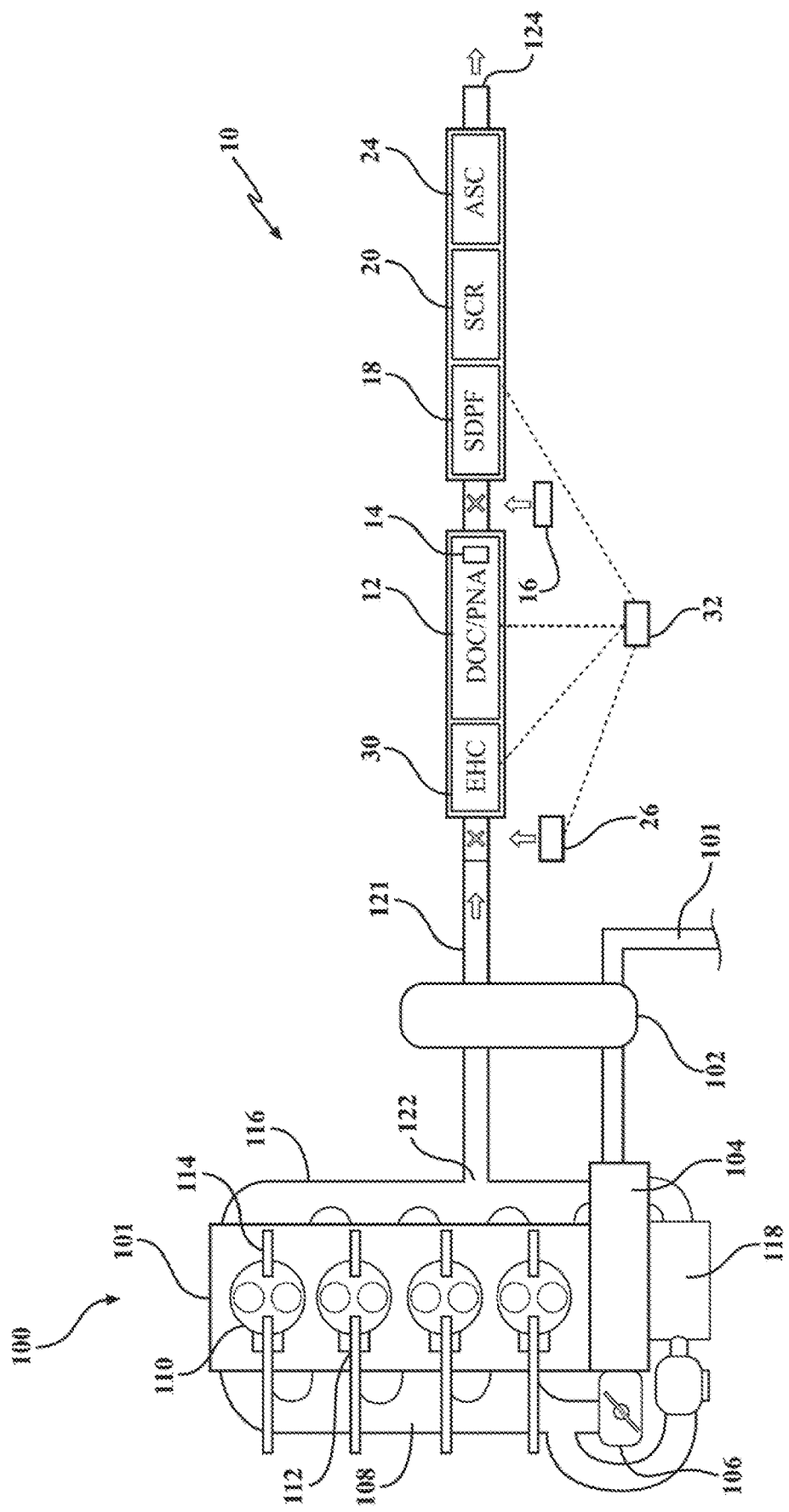
FIG. 4 is a first preferred arrangement of an exhaust after-treatment system in accordance with the subject disclosure.
Figure 5:
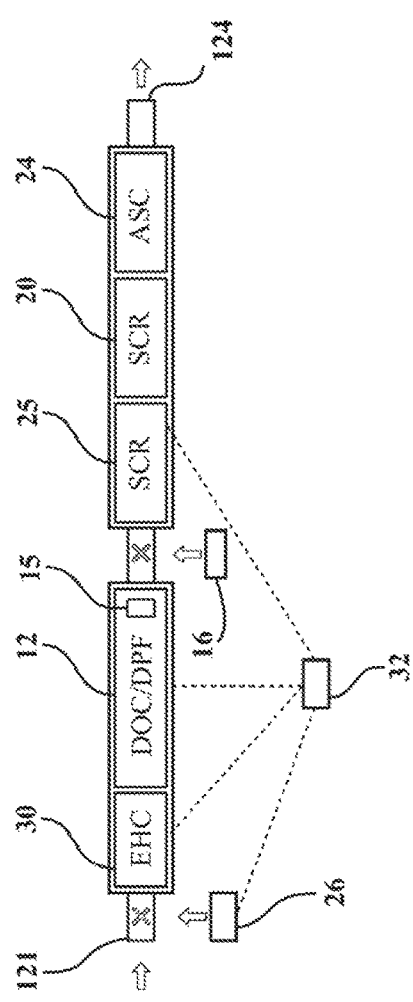
FIG. 5 is a second preferred arrangement of the exhaust after-treatment system in accordance with the subject disclosure.

Referring to the Figures, wherein like numerals indicate corresponding parts throughout the several views, an exhaust after-treatment system 10 in accordance with the subject disclosure is generally illustrated in FIGS. 4 and 5 for the removal or suppression of emissions from an internal combustion engine (ICE) 100. For example, as illustrated in FIG. 4, the exhaust after-treatment system 10 is fluidly coupled to a diesel ICE 100 with an air intake 101 fluidly coupled to a turbocharger 102. The turbocharger 102 provides pressurized air to the diesel ICE 100 through an intercooler 104 and an intake throttle valve 106. The intake throttle valve 106 can adjust the amount of air that enters the diesel ICE 100. The pressurized air can pass through an intake manifold 108 before entering one or more individual cylinders 110. Fuel can be introduced to the individual cylinders 110 through one or more fuel injectors 112 positioned within each cylinder 110. A glow plug 114 is positioned within each of the cylinders 110 or respective cylinder heads.

The diesel ICE 100 includes an exhaust manifold 116 and an exhaust pipe 121 with an inlet 122 and an outlet 124 for releasing from the diesel ICE an exhaust produced in combustion. Such exhaust may include components undesirable for discharge into the atmosphere, such as NOx, CO, soot, methane, NMHC, HC, NO, and the like. Accordingly, the exhaust after-treatment system 10 is fluidly connected between the inlet 122 and the outlet 124 of the exhaust pipe to receive exhaust from the diesel ICE for removing or suppressing these undesirable components. The diesel ICE 100 may also include an exhaust gas recirculation (EGR) system 118 that allows at least a portion of exhaust gas to be recirculated through the diesel ICE 100.

As illustrated in FIGS. 4 and 5, the exhaust after-treatment system 10 includes a diesel oxidation catalyst (DOC) 12 coupled to the exhaust pipe 121, downstream of the diesel ICE 100 in the direction of the flow or path of the engine exhaust gas. The DOC 12 includes an internal catalyst support structure to which a DOC washcoat is applied. Accordingly, DOC 12 is configured to oxidize residual CO, hydrogen, methane, and NMHC present in the engine exhaust. As illustrated in FIG. 4, in a first embodiment, a passive NOx absorber (PNA) 14 is coupled to the DOC 12 to also absorb NOx present in the engine exhaust. Accordingly, this combined diesel oxidation catalyst/passive NOx absorber (DOC/PNA) 12, 14 is be located downstream from the EGR system 118. However, as illustrated in FIG. 5, in a second embodiment a diesel-type particulate filter (DPF) 15 can alternatively be coupled to the DOC 12.

As further illustrated in FIG. 4, the exhaust after-treatment system 10 includes a reducing agent dosing system 16, a SCR coated diesel particulate filter (SDPF) 18, and a selective catalytic reduction (SCR) 20 serially located downstream from the DOC/PNA 12, 14. The reducing agent dosing system 16 is configured to receive and inject a reducing agent into the exhaust pipe, and thus the exhaust stream, upstream of the SDPF 18 and SCR 20. The reducing agent can be urea, anhydrous ammonia, aqueous ammonia or a combination thereof. In embodiments where the reducing agent is a urea solution, the reducing agent will decompose into water, ammonia, and carbon dioxide. The remaining urea will decompose upon contact with the SDPF 18 and SCR 20. The SDPF 18 and SCR 20 are configured to facilitate one or more chemical reactions between ammonia formed by the decomposition of the injected reducing agent and NOx from the engine exhaust, thereby reducing the amount of NOx released into the atmosphere. However, as illustrated in FIG. 5, in the second embodiment of the exhaust after-treatment system 10 the SDPF 18 is replaced with an additional SCR 25 disposed upstream of the SCR 20. In either embodiment, the exhaust after-treatment system 10 also includes an ammonia slip catalyst (ASC) 24 disposed downstream of the SCR 20 to provide ammonia slip control, and a fuel dosing system 26 is disposed upstream of the DOC 12 for the dosing of diesel fuel into the exhaust upstream of the DOC 12.

Under some conditions, the above-mentioned combination of exhaust after-treatment devices does not provide the desired level of emissions control, particularly the Ultra Low Nox standard of 0.02 g/bhp-hr being considered for implementation by the ARB in the 2023-2027 timeframe. Such conditions may include cold-start or low-load temperature operation, where a significant amount of NOx could be transmitted through exhaust system 10 as the SCR mid bed temperature might be below the urea dosing threshold of 200 degrees C. In such conditions, active heating measures are required to bring the SCR mid temperature about 200 degrees C. to achieve NOx conversion.

In the above-mentioned combination of exhaust after-treatment devices, a significant amount of NMHC could be transmitted through DOC 12 before the oxidation catalyst in the DOC 12 reaches its light off temperature. Accordingly, as best illustrated in FIGS. 4 and 5, the exhaust after-treatment system 10 includes an electrically heated catalyst (EHC) 30 coupled to and upstream of the DOC 12 to supply electric power and electric heating to the DOC 12 to more quickly achieve light-off temperature. In other words, the electrically heated catalyst (EHC) 30 reduces an amount of time until a DOC light-off temperature is reached relative to exhaust after-treatment systems that do not include an electrically heated catalyst (EHC). Although not expressly illustrated, the EHC 30 and DOC 12 could be replaced by a metallic DOC for electric heating.

As illustrated in FIGS. 4 and 5, a controller 32 is operably coupled to and in communication with the DOC 12 and the EHC 30 and is configured to operate the EHC in response to a monitored mid-bed temperature of the DOC 12. More specifically, the controller 32 is configured to supply electrical power to the EHC 30 in response to detecting that a mid bed temperature of the DOC 12 is less than a predetermined temperature value, preferably 180 degrees Celsius. Once the controller 32 detects that the mid bed temperature of the DOC 12 has reached the predetermined temperature value, the controller disconnects the supply of electrical power to the EHC 30. The controller 32 is also operably coupled with and in communication with the fuel dosing system 26 and the SDPF 18 and is configured to operate the fuel dosing system 26 in response to the detected mid bed temperature of the SDPF 18 relative to a predetermined temperature value of the SDPF 18. More specifically, the controller 32 is configured to turn on and operate the fuel dosing system 26 in response to the detected mid bed temperature of the SDPF 18 exceeding the predetermined SDPF temperature value. Thus, when the electrically heated catalyst (EHC) 30 is turned off by the controller 32, the controller 32 concurrently begins operation of the fuel dosing system 26 to inject hydrocarbons into the exhaust (using either late in-cylinder post injection or exhaust HC dosing) to raise the SDPF 18 mid-bed temperature to 200 degrees C., and more preferably above 260 degrees Celsius. If the SDPF 18 is replaced with an additional SCF 25, such as illustrated in FIG. 5, the fuel dosing system 26 is controlled based on a detected mid bed temperature of the additional SCR 25. The alternating operation of the electrically heated catalyst (EHC) 30 and the fuel dosing system 26 based on the mid bed temperature of the DOC 12 and SDPF 18 (or additional SCR 25) advantageously allows the exhaust after-treatment system 10 to maintain the SDPF 18 (or additional SCR 25) mid bed temperature above 200 degrees Celsius during the complete duty cycle.

In summary, the fuel dosing system 26 as well as the EHC 30 are operated based on the mid bed temperature of SDPF 18 (or the additional SCR 25). When the controller 32 detects a need to increase SDPF 18 mid bed temperature (during cold start conditions and low load operation) it evaluates whether DOC 12 mid bed temperature is above the light-off temperature for initiating HC dosing. If the temperature is below light-off temperature, the EHC 30 is turned on to bring the DOC 12 mid temperature above 200 degrees C. after which the HC dosing starts. The HC dosing is then controlled to maintain the SCR mid bed temperature above the predefined SCR temperature limit, such as 200 or 220 degrees C.

Figure 1:
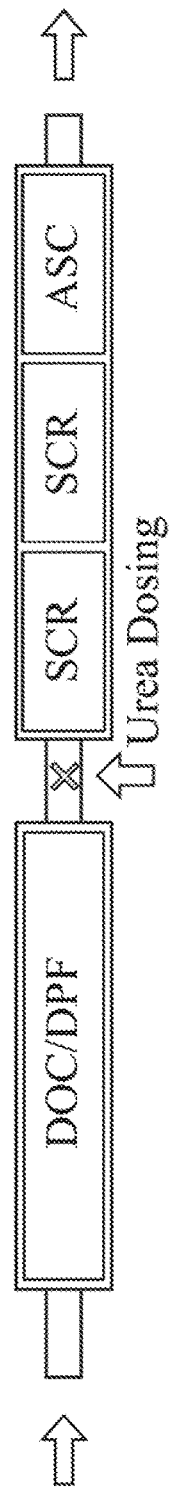
FIG. 1 is a first prior art arrangement of an exhaust after-treatment system.
Figure 2:
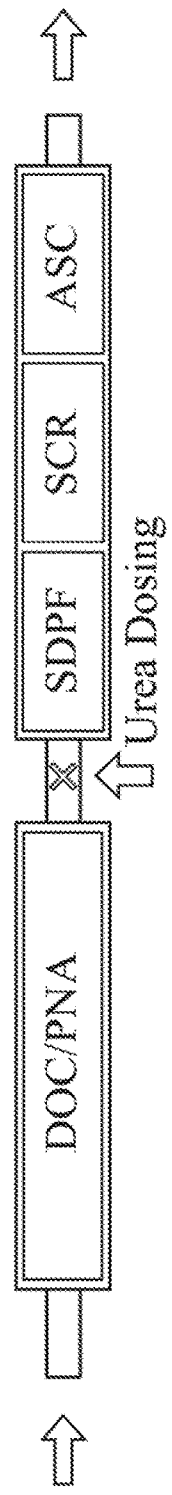
FIG. 2 is a second prior art arrangement of an exhaust after-treatment system.
Figure 3:
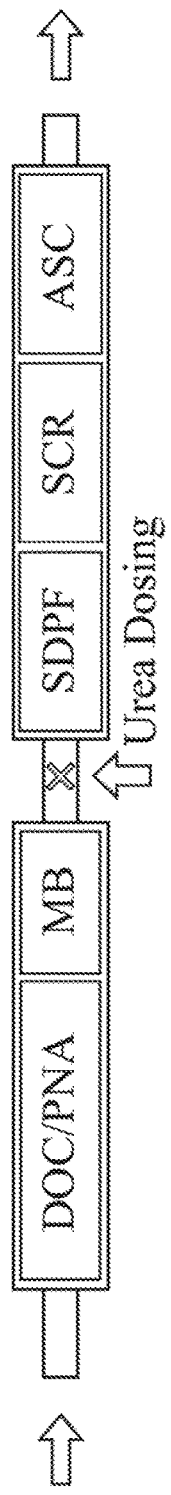
FIG. 3 is a third prior art arrangement of an exhaust after-treatment system.
Figure 6:
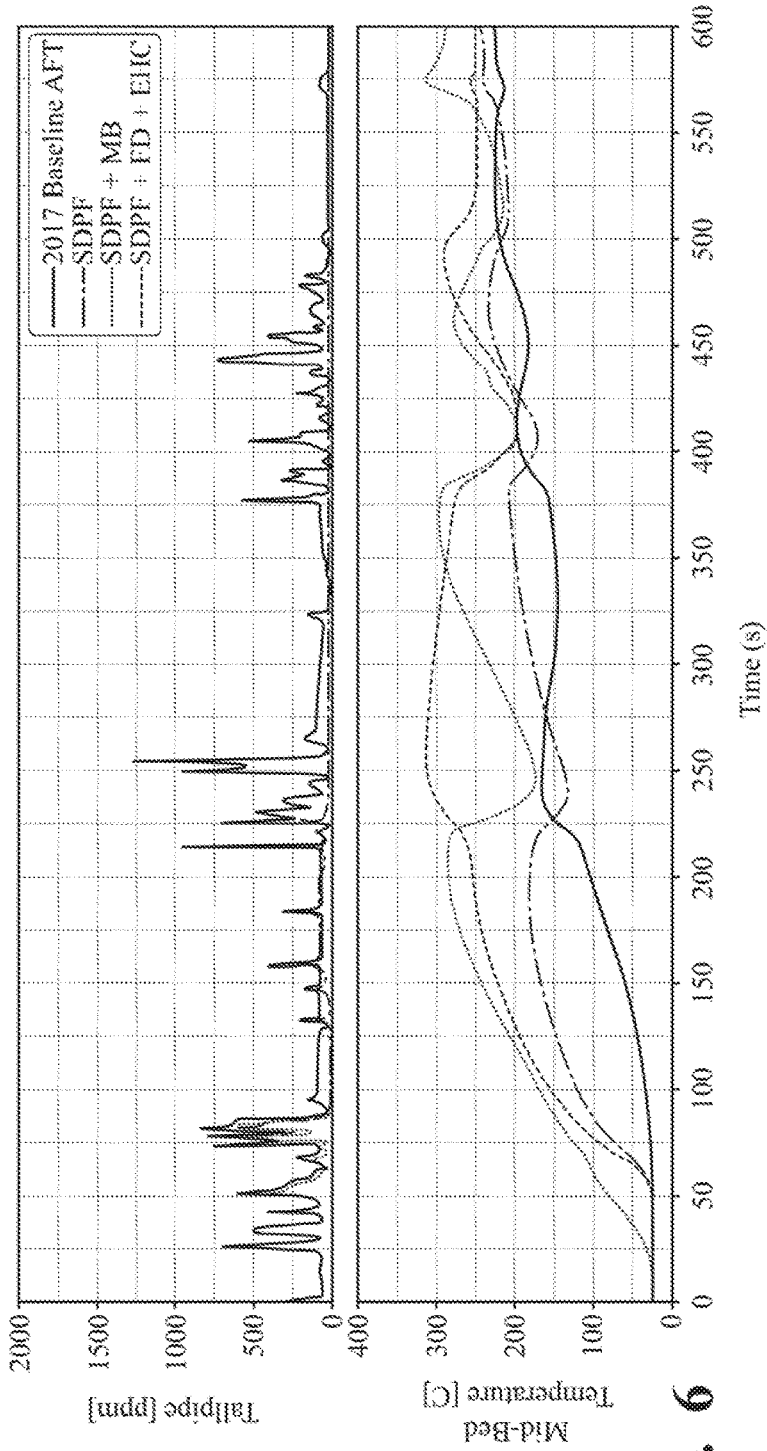
FIG. 6 is a chart illustrating the comparative performance of the preferred arrangement of the exhaust after-treatment system relative to three different prior art arrangements in time for the SDPF mid bed temperature as well as tailpipe NOx emissions.
Figure 8:
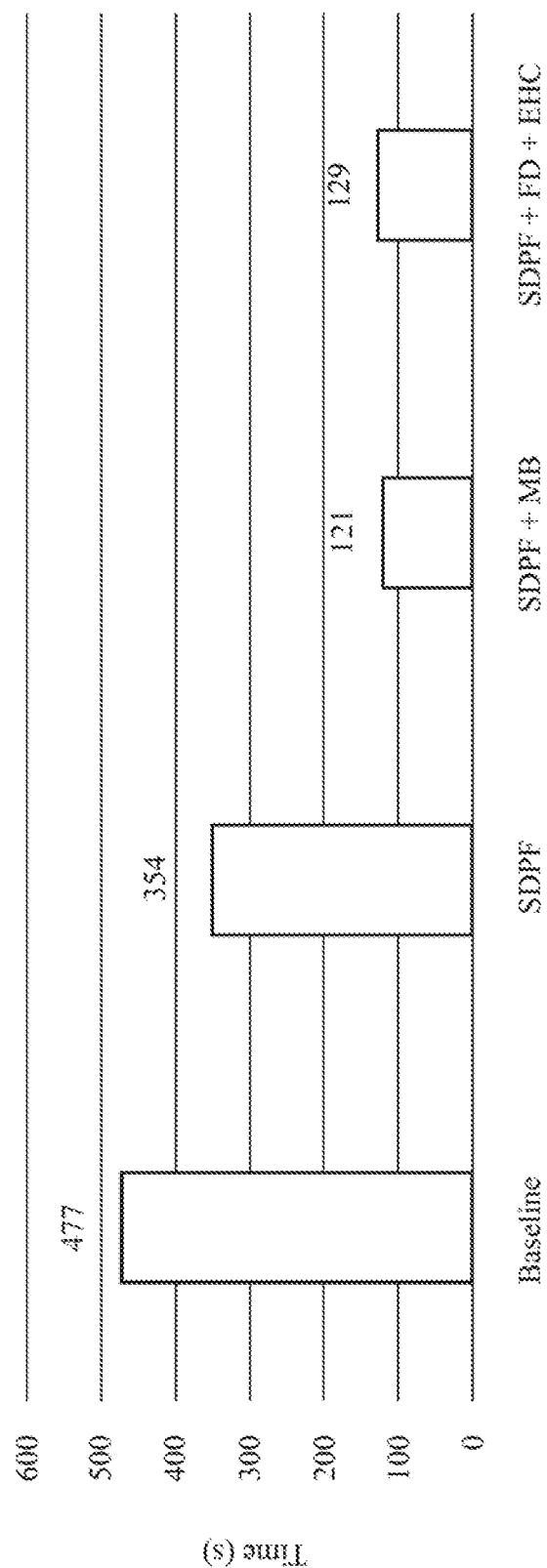
FIG. 8 is a graph illustrating a time until SDPF mid bed temperature reached above 200 degrees C. of the preferred arrangement of the exhaust after-treatment system relative to the three different prior art arrangements.

As illustrated in FIGS. 6 and 8, operation of the exhaust after-treatment system in accordance with the aforementioned principles also advantageously allows the SDPF 18 mid bed temperature to be reach 200 degrees Celsius quicker, such as in 129 seconds on a cold start HD-FTP cycle. This performance is comparable to the prior art exhaust after-treatment system which requires a mini-burner to achieve a SDPF 18 mid bed temperature of 200 degree Celsius in 121 seconds. However, as noted previously, the prior art system which relies on the mini-burner disadvantageously is accompanied by reliability concerns of the mini-burner as well as OBD challenges. As noted above, the reduced time for the SDPF 18 mid bed temperature to reach 200 degree Celsius is achieved through the intelligent control of the electric heated catalyst 30 and exhaust fuel dosing (exhaust HC dosing) based on a detected mid-bed temperature of the DOC 12 and the SDPF 18. As further illustrated in FIG. 8, the exhaust after-treatment system 10 in accordance with the subject principles achieves a desired SDPF 18 mid bed temperature of 200 degree Celsius significantly faster over other prior art systems, such as those illustrated in FIGS. 1 and 2, which achieve the desired SDPF 18 mid bed temperature of 200 degree Celsius in 477 seconds and 354 seconds, respectively.

Figure 7:
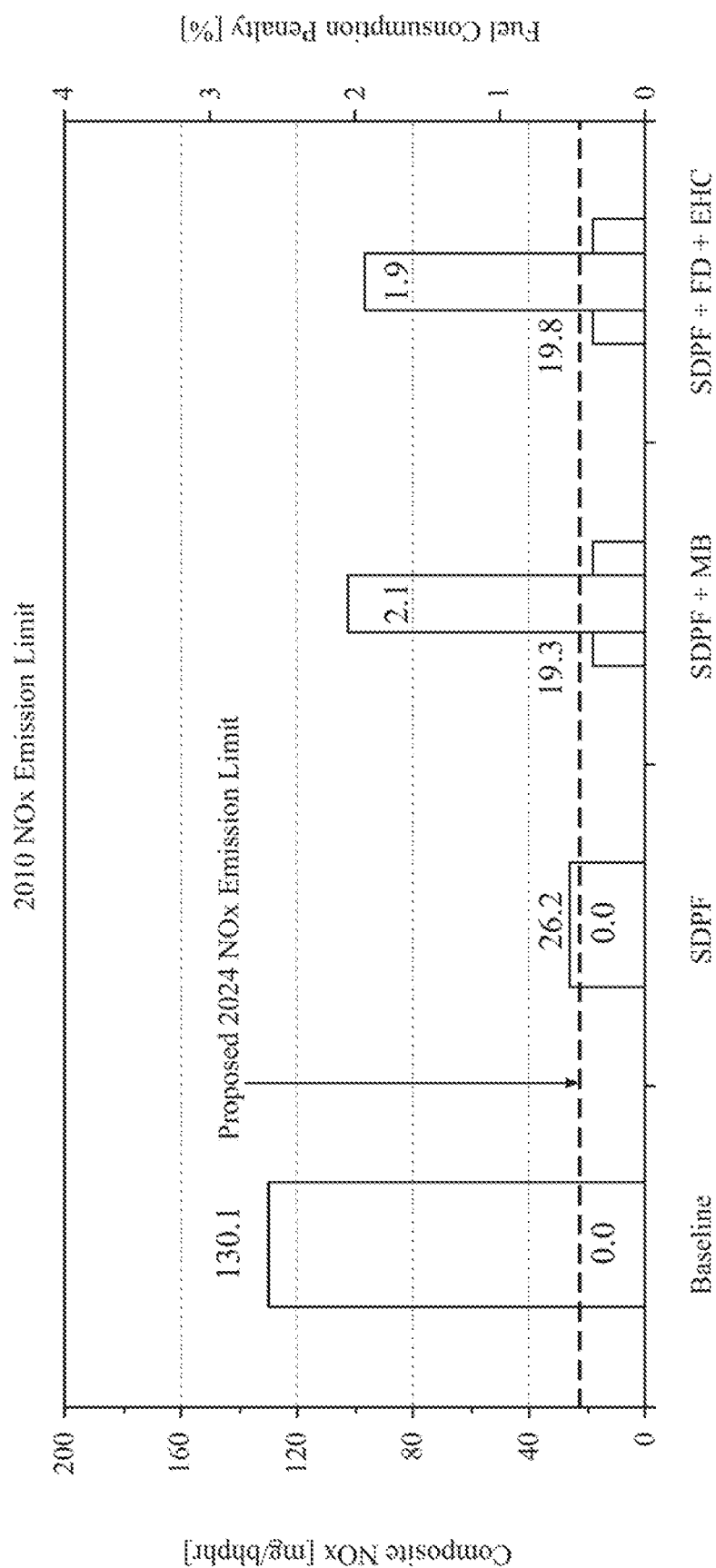
FIG. 7 is a graph illustrating the comparative performance of the preferred arrangement of the exhaust after-treatment system relative to the three different prior art arrangements in composite NOx emissions and fuel consumption penalty.

As further illustrated in FIG. 7, a comparison of the exhaust after-treatment device 10 to the prior art arrangement which relies on a mini-burner (MB) illustrates that the fuel penalty with the subject exhaust after-treatment system 10 is also marginally lower (1.9%) as compared to the use of a mini-burner (2.1%). As further illustrated in FIG. 6, the subject exhaust after-treatment system 10 is also comparable in terms of NOx reduction to the prior art exhaust after-treatment system relying on the mini-burner (MB). For example, the subject exhaust after-treatment system 10 achieves composite NOx levels of 1.9 mg/bhp-hr versus the composite NOx level of 2.1 mg/bhp-hr achieved by the prior art exhaust treatment system with a mini-burner. Although both strategies are equally effective in reducing SCR warm-up times, the prior art mini-burner approach to an exhaust after-treatment device is significantly more challenging from an OBD stand point.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system fluidically coupled to an exhaust pipe of a diesel internal combustion engine (ICE) for treating an exhaust gas, the exhaust after-treatment system comprising:
   a diesel oxidation catalyst (DOC) disposed in a downstream path of the exhaust gas produced by the diesel internal combustion engine;
   a selective catalytic reduction (SCR) disposed downstream of said diesel oxidation catalyst;

an electrically heated catalyst (EHC) coupled to said diesel oxidation catalyst and configured to electrically heat said diesel oxidation catalyst for reducing an amount of time to reach a DOC light-off temperature;

a controller operably coupled with said diesel oxidation catalyst and said electrically heated catalyst and configured to supply electrical power to said electrically heated catalyst in response to a mid bed temperature of said diesel oxidation catalyst being less than a predetermined DOC temperature value and discontinue the supply of electrical power to said electrically heated catalyst in response to detected the mid bed temperature of said diesel oxidation catalyst being greater than the predetermined DOC temperature value;

an SCR coated diesel particulate filter (SDPF) disposed downstream of said diesel oxidation catalyst and upstream of said selective catalytic reduction (SCR);

a fuel dosing system disposed upstream of said diesel oxidation catalyst and configured to dose the path of exhaust gas; and said controller operably coupled to said fuel dosing system and said SDPF and configured to operate said fuel dosing system in response to detecting a mid bed temperature of said SDPF being lower than a predetermined SDPF temperature value and said discontinued supply of electrical power to said electrically heated catalyst.

2. An exhaust after-treatment system as set forth in claim 1, wherein the predetermined DOC temperature value is 180 degrees Celsius.

3. An exhaust after-treatment system as set forth in claim 2, further comprising an ammonia slip catalyst (ASC) disposed downstream of said selective catalytic reduction.

4. An exhaust after-treatment system as set forth in claim 3, further comprising a reducing agent dosing system disposed upstream of said selective catalytic reduction and configured to receive and inject a reducing agent into the path of exhaust gas.

5. An exhaust after-treatment system as set forth in claim 1, further comprising a passive NOx absorber (PNA) coupled to said diesel oxidation catalyst.

6. An exhaust after-treatment system as set forth in claim 1, further comprising
 an additional selective catalytic reduction disposed downstream of said diesel oxidation catalyst and upstream of said selective catalytic reduction;
 a fuel dosing system disposed upstream of said diesel oxidation catalyst and configured to dose the path of exhaust gas; and
 said controller operably coupled to said fuel dosing system and said additional selective catalytic reduction and configured to operate said fuel dosing system in response a mid bed temperature of said additional selective catalytic reduction.

7. An exhaust after-treatment system as set forth in claim 6, further comprising
 a diesel particulate filter (DPF) coupled to said diesel oxidation catalyst.

* * * * *